(12) United States Patent
Servaas

(10) Patent No.: US 12,269,192 B2
(45) Date of Patent: Apr. 8, 2025

(54) PROCESS FOR THE PRODUCTION OF A COMPOSITE MATERIAL FROM TEXTILE WASTE AND POLYETHYLENE FILM WASTE

(71) Applicant: VIVE TEXTILE RECYCLING SPOLKA Z O.O., Warsaw (PL)

(72) Inventor: Bertus Jan Servaas, Kielce (PL)

(73) Assignee: VIVE TEXTILE RECYCLING SPOLKA Z.O.O, Warsaw (PL)

( * ) Notice: Subject to any disclaimer, the term of this patent is extended or adjusted under 35 U.S.C. 154(b) by 826 days.

(21) Appl. No.: 17/440,495

(22) PCT Filed: Mar. 16, 2020

(86) PCT No.: PCT/PL2020/000027
§ 371 (c)(1),
(2) Date: Sep. 17, 2021

(87) PCT Pub. No.: WO2020/197419
PCT Pub. Date: Oct. 1, 2020

(65) Prior Publication Data
US 2022/0152878 A1 May 19, 2022

(30) Foreign Application Priority Data
Mar. 22, 2019 (PL) .......................... 429361

(51) Int. Cl.
| B29B 17/00 | (2006.01) |
| B29B 17/02 | (2006.01) |
| B29B 17/04 | (2006.01) |
| B29C 48/00 | (2019.01) |

(52) U.S. Cl.
CPC ...... *B29B 17/0036* (2013.01); *B29B 17/0412* (2013.01); *B29C 48/022* (2019.02); *B29B 2017/0203* (2013.01); *B29B 2017/0268* (2013.01); *B29K 2023/06* (2013.01)

(58) Field of Classification Search
CPC ............ B29B 17/0036; B29B 17/0412; B29B 2017/0203; B29B 2017/0268; B29C 48/022; B29K 2023/06
USPC ...................................................... 521/40.5
See application file for complete search history.

(56) References Cited

U.S. PATENT DOCUMENTS

| 2005/0112226 A1* | 5/2005 | Kamite ..................... B29B 9/12 425/200 |
| 2007/0212531 A1* | 9/2007 | McIntyre ............ B29B 17/0042 425/149 |
| 2008/0128933 A1* | 6/2008 | Przybylinski ........... B29B 7/603 521/40 |
| 2008/0213562 A1* | 9/2008 | Przybylinski ............. B29B 7/92 156/701 |

FOREIGN PATENT DOCUMENTS

CN        105585867 A       5/2005

OTHER PUBLICATIONS

Anonymous: "Recycling Post-consumer Waste and Film Waste", Recycling magazine, Jun. 23, 2016 (2016), XP055711427, retrieved from the Internet: URL: https:/www.recycling-magazine.com/2016/06/23/recycling-post-consumer-waste-and-film-waste/ [ retrieved on Jul. 3, 2020]. (Year: 2016).*
Anonymous: Recycling Post-consumer Waste and Film Waste, Recycling magazine, Jun. 23, 2016 (2016), XP055711427, retrieved from the Internet: URL: https:/www.recycling-magazine.com/201 6/06/23/recycling-post-consumer-waste-and-film-waste/ [ retrieved on Jul. 3, 2020].Anonymous: (Year: 2016).*
Finkler, M. et al., "HDPE Composites with Textile Fibers Waste. Part I: Mechanical Characterization", Polímeros: Ciência e Tecnologia, 2005, vol. 15, No. 3, p. 171-175.
Finkler, M. et al., "Incorporation of Waste Textile Fabric in High Density Polyethylene Matrix", Progress in Rubber, Plastics and Recycling Technology, 2006, vol. 22, No. 2 pp. 115-126.
Gowayed, Y. A. et al., "Synthesis of Composite Materials from Waste Fabrics and Plastics", Journal of Elastomers and Plastics, 1995, vol. 27, pp. 79-90.
International Search Report issued by the International Searching Authority (ISA/O.E.P.M. ) on Jul. 3, 2020 in connection with International Application No. PCT/PL2020/000027.

* cited by examiner

*Primary Examiner* — Michael M. Bernshteyn
(74) *Attorney, Agent, or Firm* — Gary J. Gershik

(57) ABSTRACT

The invention relates to a process for the production of a composite material from textile waste and polyethylene film waste, characterized in that it comprises the following steps: a) comminuting the textile waste into the fraction up to 15 mm in size, b) comminuting the polyethylene film into the fraction up to 15 mm in size, c) separating metal parts from the comminuted textiles, d) separating metal parts and unwanted plastics from the comminuted film, e) further comminuting the textiles into the fraction up to 5 mm in size, f) mixing the comminuted textiles with the comminuted film, said textiles constituting 10-50% of the mixture, g) plasticizing, homogenizing and extruding the obtained mixture in an extruder at the temperature of 170-240° C. and under the pressure of 8-15 MPa.

20 Claims, No Drawings

PROCESS FOR THE PRODUCTION OF A COMPOSITE MATERIAL FROM TEXTILE WASTE AND POLYETHYLENE FILM WASTE

RELATED APPLICATIONS

This application is a § 371 national stage of PCT International Application No. PCT/PL2020/000027, filed Mar. 16, 2020, claiming priority of Polish Patent Application No. P.429361, filed Mar. 22, 2019, the contents of each of which are hereby incorporated by reference into this application.

The subject matter of the invention relates to a process for the production of a composite material from textile waste and polyethylene film waste. The invention pertains to the field of producing composite materials from waste.

Consumer textile waste comprises mainly waste clothing, as well as bed-linen, towels, curtains and other textiles used in households. The waste is characterized by high diversification in terms of their composition, constitution and quality. It can be composed of natural fibers (e.g. wool, cotton, silk, linen), synthetic fibers (e.g. polyester, polypropylene, nylon, elastane, acrylic), as well as a combination thereof. Textile waste can also include other materials, such as metals, rubber, glass and plastics, and it can be soiled and damp.

Various methods for textile waste management are known. One of them involves processing textile waste in the presence of a thermoplastic binder into composite materials of required performance properties.

WO 2009/148302 A1 discloses a process for the production of articles from textile waste. The process is characterized by comprising initial examining and sorting of the provided textile waste, followed by subdividing of the waste into profitable and unprofitable waste from economic point of view. The selected textiles are stripped of unwanted materials, the textiles are comminuted to the 0.2 mm or smaller fraction, followed by mixing the comminuted textiles with a resin. The obtained mass is extruded to a desired form and allowed to harden.

PL208532B1 discloses a process for the production of a composite of a thermoplastic polymer with natural fibers. The composite is obtained by mixing sections of the natural fibers with the thermoplastic polymer, heating and extruding the mixture. In this process, the natural fibers are cut into 0.3-10 mm long fragments, then they are added to the thermoplastic polymer in the amount of 25 to 80 parts by weight, followed by mixing the components and extruding the resultant mixture at the processing temperature of the polymer constituting the matrix of the composite to obtain a granulate.

WO200132405A1 discloses a process for the production of composite articles, wherein textile waste is comminuted into about 1-75 mm long fibers. Then the fibers are mixed at the level of 10-70% with a thermoplastic material, e.g. polyethylene waste, and the mixture is heated until the thermoplastic material has melted.

WO2015044894A1 discloses a process for the production of a composite product. Textile waste is comminuted into 0-15 mm long fibers. Then the fibers are mixed at the ratio of at least 70% with a thermoplastic binder of 1-15 mm granulation. The binder can comprise 50-90% of polyethylene waste. The mixture is heated and then formed into a nonwoven mat.

The processes for the production of composite materials from textile waste and a thermoplastic binder known in the state of the art do not allow for high variability in a textile material stream as regards its composition, constitution and quality. Save for few exceptions, in practice the textiles used in households do not comprise a single kind of fibers. The present inventors have noticed that the kind of fibers included in the composition of textiles have a significant influence on the physical-chemical properties of a composite obtained therefrom. Different kinds of fibers behave differently during the process of homogenization and mixing of the fiber mixture, including different caking tendency, different behavior as regards generation of electrostatic potentials (including a higher explosion risk level) and different behavior as regards formation of composite molecules in the primary extrusion phase (i.e. formation of a polymer sheath on a core made of a specific kind of fibers). Differences between the manufactured composite materials were manifested inter alia in: a variable homogenization level, variable warp coating level, variable material flow ratio level, variable load transfer parameters and dynamic force dispersion parameters in materials with different kinds of core (different kinds of fibers used). Therefore, an adequate choice of the composition of a raw textile makes it possible to obtain a composite with desirable and anticipated physical-chemical properties. However, considering said variability within the raw material stream, the textiles being processed must be preliminarily sorted and prepared meticulously. It is hindered by the fact that the standards of marking the fiber content on labels do not require to precisely specify the composition, but only the main groups of fibers. Additionally, in the case of textiles imported particularly from outside the European Union, the standards are not fully observed. At the same time, there is a lack of publicly available results of studies on the actual composition morphology of textiles marketed within the European Union area.

The object of the invention is to provide a process for the production of a composite material from textile waste and polyethylene film waste, which despite the instability of the raw textile stream, does not require a meticulous sorting and waste preparation process, and simultaneously provides a composite material of desired physical-chemical properties and is environmentally friendly.

The invention relates to a process for the production of a composite material from textile waste and polyethylene film waste, characterized in that it comprises the following steps:
a) comminuting the textile waste into the fraction up to 15 mm in size,
b) comminuting the polyethylene film into the fraction up to 15 mm in size,
c) separating metal parts from the comminuted textiles,
d) separating metal parts and unwanted plastics from the comminuted film,
e) further comminuting textiles into the fraction up to 5 mm in size,
f) mixing the comminuted textiles with the comminuted film, said textiles constituting 10-50% of the mixture,
g) plastificating, homogenizing and extruding the obtained mixture in an extruder at the temperature of 170-240° C. and under the pressure of 8-15 MPa.

In a preferred embodiment of the invention, the textiles comprise synthetic fibers at the level of at least 30%.

In another preferred embodiment, the textiles constitute 28% of the mixture.

Preferably, in step e), the textiles are comminuted into the fraction up to 2 mm in size.

Preferably, in step b), the polyethylene film is comminuted into the fraction up to 10 mm in size.

In another embodiment of the process according to the invention, in step g), the mixture is admixed with additives in the amount up to 4%, selected from the group comprising compatibilizers, lubricants and colorants.

In a preferred embodiment, the process according to the invention further comprises granulating the composite material obtained in step g).

Reduction of the influence of the kind of processed textile waste fibers on the physical-chemical properties of the produced composite was attained by proper selection of process parameters such as the ratio of amount of the textile component to the polyethylene component, the degree of comminution of the textile component and polyethylene component, and the temperature and pressure of the process. As a result, it is possible to produce a composite material from textile waste and polyethylene film waste with the desired physical-chemical properties, without meticulous sorting and preparing the waste. Moreover, the process according to the invention is environmentally friendly because it reduces $CO_2$ emissions. According to the report $CO_2$-kantallen afvelscheiding, SenterNovem, September 2007, the produced composite material allows one to reduce about 3 kg of $CO_2$ per each unburned kilogram of textile waste.

The invention is illustrated by the following example.

Textile waste was supplied in the form of whole clothes packed in bales weighing up to 25 kg. The textiles were visually inspected with regard to the level of soil, dampness and uniformity of textile kinds in a bale, and statistically verified with regard to the presence of raw materials other than textiles (e.g. shoes, toys, purses etc.) in the supply. Then, the textiles were sorted into textiles with predominant content of natural fibers, textiles with predominant content of synthetic fibers and textiles not suitable for the process (too damp, too soiled and containing a considerable percentage of unwanted admixed materials). Polyethylene film waste was supplied packed in bales weighing up to 25 kg. The film was visually inspected with regard to the level of soil, dampness and uniformity of film kinds in a bale and the bales were statistically verified with regard to the presence of raw materials other than the film (e.g. textile remnants, additives, etc.) in the supply.

The textiles were transported by a belt conveyor to a shredder equipped with sieves with 15 mm holes wherein the textiles were comminuted into the fraction up to 15 mm in size. Subsequently, the comminuted textiles were transported by a conveyor into a separation assembly (separators) wherein the undesired parts ('undesired' means not being textiles, including metal parts, parts made of plastics) were separated from the remaining comminuted textile part. The textiles without the unwanted parts were transported by a screw conveyor to a final shredder wherein the textiles were comminuted to a fraction of the size presented in Table 1. The comminuted textiles were stored in a textile buffer container.

The film was transported by a belt conveyor to a shredder equipped with sieves with 15 mm holes wherein the film was comminuted into flakes up to 15 mm in size. Subsequently, the comminuted film was transported by a belt conveyor into a separator wherein the undesired parts ('undesired' means not being the film flakes, including metal parts, parts made of plastics not corresponding to the predetermined basis weight of a flake after comminution, paper) were separated. The separator detected and separated the undesired parts from the remaining comminuted film part. The comminuted film without the unwanted parts was stored in a film buffer container.

The comminuted textiles and film were dosed from the buffer containers into a mixer by means of a screw conveyor in controlled and precisely defined amounts presented in Table 1. The amounts of the dosed components were controlled by adjusting the rotational speed of the screw. The components were mixed continuously. The paddles of the mixer were positioned at a 45-degree angle relative to the axis of the mixer to provide flow of the components through the mixer. The flow was controlled by adjusting the size of the outlet opening of the mixer. In the mixer, the materials were mixed. The obtained mixture was transported by means of the conveyor to a mixture buffer container.

The mixture from the buffer container was dosed to a twin-screw extruder with conical screw geometry, at a dosing rate of 400 kg/h. The temperature in individual sections of the extruder was S1: 180° C., S2: 180° C., S3: 190° C., S4: 190° C. and S5: 200° C., and the pressure at melting was 9 MPa. The rotational speed of the extruder was 90 rpm. The mixture was admixed with additives, i.e. resins based on ethylene/vinyl acetate copolymer (the commercial product Elvax) and maleic anhydride-grafted resins (the commercial product Fusabond), in the amounts presented in Table 1. In the extruder, the mixture was plasticized, degassed, homogenized and granulated. The composite material was produced in the form of granules having 4 mm diameter.

Table 1 shows the composition and parameters of various composite material samples produced according to the above-described process. Each sample relates to a composite material produced from a separate textile waste supply.

TABLE 1

| Sample name | #2 | #3 | #4 | MIX 1 | MIX 2 | MIX 3 | MIX 4 |
|---|---|---|---|---|---|---|---|
| Textile fraction size (mm) | up to 2 | up to 2 | up to 2 | up to 5 | up to 5 | powder | up to 2 |
| Film fraction size (mm) | up to 15 | up to 15 | up to 15 | up to 15 | up to 15 | up to 15 | up to 15 |
| Textile content (%) | 10 | 28 | 48 | 36 | 50 | 50 | 48 |
| Film content (%) | 89 | 68 | 48 | 60 | 46 | 46 | 48 |
| Fusabond (%) | 0.5 | 2 | 2 | 2 | 2 | 2 | 2 |
| Elvax (%) | 0.5 | 2 | 2 | 2 | 2 | 2 | 2 |
| Melt flow index (g/10 min) | | | | | | | |
| 190° C.; 2.16 kg | 0 | 0 | 0 | 0 | 0 | 0 | 0 |
| 190° C.; 5.00 kg | 0.071 | 0.067 | 0.218 | 0.061 | 0 | 0.055 | 0.218 |
| 190° C.; 10.00 kg | 0.345 | 0.312 | 1.158 | 0.5 | 0.046 | 0.426 | 1.158 |
| Density (g/cm$^3$) | 0.986 | 0.998 | 1.15 | 1.107 | 1.193 | 1.162 | 1.15 |
| Bulk density (g/cm$^3$) | 0.267 | 0.319 | 0.317 | 0.315 | 0.295 | 0.316 | 0.317 |
| Tensile strength (Mpa) | 17.2 | 11.4 | 11.14 | 12.23 | 16.7 | 11.96 | 11.14 |
| True tensile stress (Mpa) | 10.37 | 8.1 | 9.66 | 1.64 | 16.68 | 8.87 | 9.66 |
| Elongation at maximum stress (%) | 4.28 | 3.43 | 1.38 | 3.17 | 1.81 | 1.96 | 1.38 |
| Elongation at break (%) | 4.83 | 1.64 | 1.59 | 1.08 | 1.83 | 2.7 | 1.59 |
| Water absorption (%) | 0.46 | 0.94 | 1.24 | 0.95 | 1.48 | 1.14 | 1.24 |

The data in Table 1 show that the composite materials produced by the process according to the invention from textile waste derived from different supplies exhibit similar physical-chemical properties for samples with similar composition of the raw textile and film.

The composite material produced by the process according to the invention is applicable for forming (e.g. by the extrusion method) various final products, such as: posts, profiles, planks (including tongue-and-groove planks), clothing hangers, picnic tables and benches, street lamp bodies.

The invention claimed is:

1. A process for the production of a composite material from textile waste derived from clothing and polyethylene film waste, comprising the following steps:
   a) comminuting the textile waste derived from clothing into a comminuted textile fraction up to 15 mm in size, and comminuting the polyethylene film into a comminuted polyethylene film fraction up to 15 mm in size,
   b) separating metal parts from the comminuted textile fraction, and separating metal parts and unwanted plastics from the comminuted polyethylene film fraction,
   c) further comminuting the comminuted textile fraction into a further comminuted textile fraction up to 5 mm in size,
   d) mixing the further comminuted textile fraction with the comminuted polyethylene film fraction, said further comminuted textile fraction constituting 10-50% of the mixture, and
   e) plasticizing, homogenizing and extruding the obtained mixture in an extruder at a temperature of 170-240° C. and under a pressure of 8-15 MPa, to thereby produce a composite material.

2. The process according to claim 1, wherein the textile waste derived from clothing comprises synthetic fibers at a level of at least 30%.

3. The process according to claim 1, wherein in step d) the further comminuted textile fraction constitutes 28% of the mixture.

4. The process according to claim 1, wherein in step c), the comminuted textile fraction is comminuted into a fraction up to 2 mm in size.

5. The process according to claim 1, wherein in step a), the polyethylene film is comminuted into a comminuted polyethylene film fraction up to 10 mm in size.

6. The process according to claim 1, wherein in step e), the mixture is admixed with additives in an amount of up to 4%, wherein the additives comprise one or more of compatibilizers, lubricants and colorants.

7. The process according claim 1, to further comprising granulating the composite material obtained in step e).

8. The process according to claim 2, wherein in step d) the further comminuted textile fraction constitutes 28% of the mixture.

9. The process according to claim 2, wherein in step c), the comminuted textile fraction is comminuted into a fraction up to 2 mm in size.

10. The process according to claim 8, wherein in step c), the comminuted textile fraction comminuted into a fraction up to 2 mm in size.

11. The process according to claim 2, wherein in step a), the polyethylene film is comminuted into a comminuted polyethylene film fraction up to 10 mm in size.

12. The process according to claim 3, wherein in step a), the polyethylene film is comminuted into a comminuted polyethylene film fraction up to 10 mm in size.

13. The process according to claim 10, wherein in step a), the polyethylene film is comminuted into a comminuted polyethylene film fraction up to 10 mm in size.

14. The process according to claim 2, wherein in step e), the mixture is admixed with additives in an amount of up to 48, wherein the additives comprise one or more of compatibilizers, lubricants and colorants.

15. The process according to claim 3, wherein in step e), the mixture is admixed with additives in an amount of up to 48, wherein the additives comprise one or more of compatibilizers, lubricants and colorants.

16. The process according to claim 4, wherein in step e), the mixture is admixed with additives in an amount of up to 48, wherein the additives comprise one or more of compatibilizers, lubricants and colorants.

17. The process according to claim 13, wherein in step e), the mixture is admixed with additives in an amount of up to 48, wherein the additives comprise one or more of compatibilizers, lubricants and colorants.

18. The process according to claim 2, further comprising granulating the composite material obtained in step e).

19. The process according to claim 3, further comprising granulating the composite material obtained in step e).

20. The process according to claim 17, further comprising granulating the composite material obtained in step e).

* * * * *